Nov. 9, 1971  H. POLLINGER ET AL  3,618,375
TEST APPARATUS FOR THE AIR BELLOWS SUSPENSION IN A VEHICLE
HAVING A CURVILINEAR RESPONSIVE CONTROL SYSTEM
Filed Dec. 12, 1969  2 Sheets-Sheet 1

INVENTORS
HANS POLLINGER
FRANZ MEIR

*Edmund M. Jaskiewicz*
ATTORNEY

Nov. 9, 1971   H. POLLINGER ET AL   3,618,375
TEST APPARATUS FOR THE AIR BELLOWS SUSPENSION IN A VEHICLE
HAVING A CURVILINEAR RESPONSIVE CONTROL SYSTEM
Filed Dec. 12, 1969   2 Sheets-Sheet 2
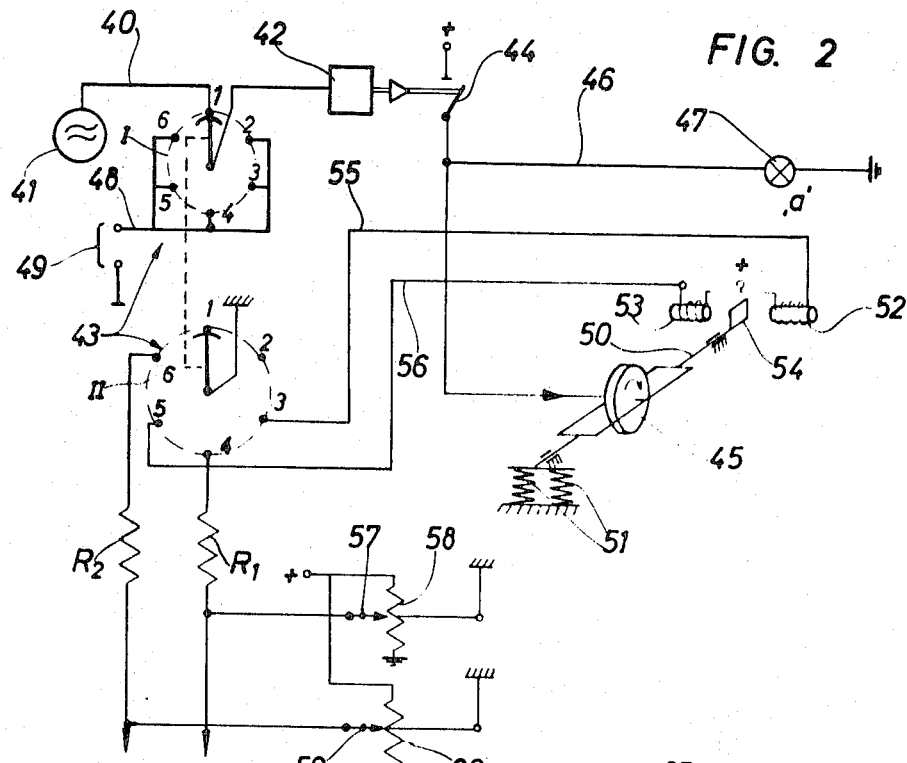
FIG. 2
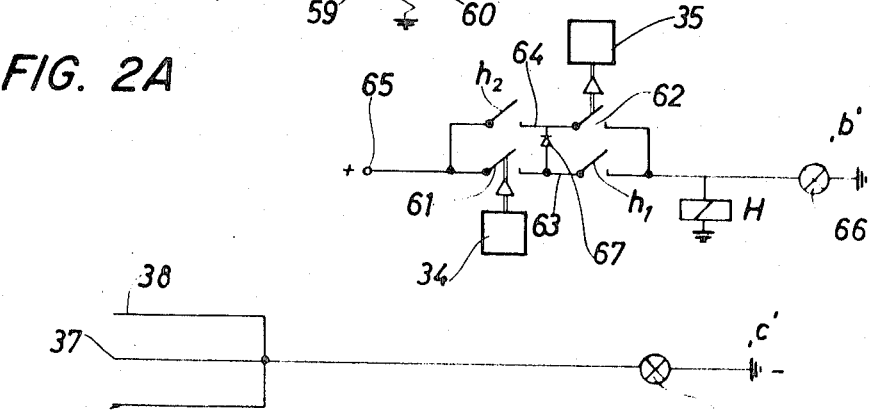
FIG. 2A
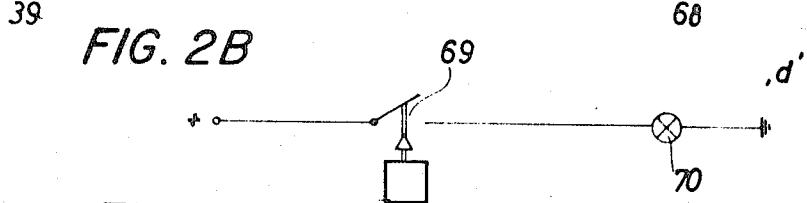
FIG. 2B
FIG. 2C
INVENTORS
HANS POLLINGER
FRANZ MEIR
ATTORNEY United States Patent Office 3,618,375
Patented Nov. 9, 1971

3,618,375
TEST APPARATUS FOR THE AIR BELLOWS
SUSPENSION IN A VEHICLE HAVING
A CURVILINEAR RESPONSIVE CONTROL
SYSTEM
Hans Pollinger, Munich, and Franz Meir, Nuremberg-Mogeldorf, Germany, assignors to Knorr-Bremse GmbH, Munich, Germany
Filed Dec. 12, 1969, Ser. No. 884,610
Claims priority, application Germany, Dec. 18, 1968,
P 18 15 366.7
Int. Cl. G01l 5/22
U.S. Cl. 73—116                                          12 Claims

ABSTRACT OF THE DISCLOSURE

A vehicle is provided with a control system for pumping air from the air bellows supporting one side of the vehicle body to the air bellows supporting the other side of the vehicle body in response to curvilinear or rectilinear travel of the vehicle to maintain the vehicle at its proper angle of inclination. The test apparatus disclosed herein enables the testing of this control system while the vehicle is stationary. The test apparatus simulates tilting of the vehicle and also simulates a measuring voltage in response to this tilting. The proper operation of the various control valves in response to these simulated voltages is then indicated on a number of indicators.

The present invention relates to vehicles having an air bellows suspension system and a control system for regulating the pumping of air between the bellows on opposite sides of the vehicle in response to curvilinear or rectilinear travel of the vehicle, more particularly, to an apparatus for testing such a control system while the vehicle is stationary.

An air suspension system for railway vehicles and other types of vehicles having a control system to which the test apparatus of the present invention relates have been disclosed in the pending patent applications Ser. No. 808,225 filed Mar. 18, 1969 and Ser. No. 798,405 filed Feb. 11, 1969. Such a control system is actuated in response to a gyroscope which indicates angular deviations of the vehicle from a central vertical longitudinal plane thereof. The control system includes a compressor which pumps air from the air spring bellows at the inside of a curve to the bellows on the outside of the curve in response to an indication of curvilinear travel of the vehicle. A system of control valves are provided in the intake and discharge lines of the compressor for shutting off or connecting these lines to the respective air spring bellows and other control valves are provided for shutting off the level regulator devices.

In addition to the above-named level regulator devices the suspension system is provided with a height regulating device which controls the total height of the air spring bellows on both sides of the vehicle and is actuated by control valves operated by the control system only during curvilinear travel of the vehicle. All of the control valves controlling the level regulator devices and the height regulating device are solenoid valves. In response to a tilting of the vehicle as sensed by the gyroscope the control system generates a measuring voltage which is a function of the angle of tilt of the vehicle. The control system may be provided with a switch relay operated by a voltage responsive to the speed of the vehicle and which disconnects the control system, and also the gyroscope, when the speed of the vehicle drops below a predetermined value.

In the event of any malfunctioning or defective operation of the control system for the air suspension bellows as described above there is a possibility that these vehicles may turn over or may be tilted to such an extent as to exceed the clearance provided for the vehicles. It is therefore desirable that the functioning of the control system be frequently checked to insure that the system is operating properly. Various testing procedures which have been proposed have not been satisfactory since they have either been too complicated to carry out or have required too much time for the use of numerous highly-skilled personnel. As a result, these testing procedures have been so expensive to conduct that they have not proved feasible in practice.

It is therefore the principal object of the present invention to provide a novel and improved test apparatus for vehicles provided with air bellows suspension and a control system for interconnecting the bellows in response to curvilinear or rectilinear travel of the vehicle.

It is another object of the present invention to provide a test apparatus for vehicles as described above wherein the operation of the system may be accurately tested even when the vehicle is stationary.

According to the present invention there is disclosed a test apparatus for the control system of a vehicle having air supporting bellows means on each side of the vehicle body and also means for regulating the level of the vehicle. The system further includes a compressor having an intake and a discharge and operating at least above a predetermined speed of the vehicle. Valve means connect the intake and discharge to the atmosphere when the vehicle is traveling in a straight line and for opening and closing the level regulating means. There is further provided a gyroscope responsive to curvilinear travel of the vehicle in order to actuate the valve means and level regulating means so that air is pumped by the compressor from the bellows means on the inside of a curve to the bellows means on the outside of the curve. In one aspect of the present invention a test apparatus for such a control system may comprise first indicator means responsive to the operation of the gyroscope. Selectively operable means are provided for deflecting the gyroscope in a given direction to simulate tilting of the vehicle even when the vehicle is stationary. Second indicator means are provided which are responsive to the valve means for indicating the state of connection of the valve means. Third indicator means are provided responsive to the level regulating means for indicating the connections thereto.

Where the air suspension system of a vehicle is equipped with a device for regulating the height of the vehicle with respect to the axis of tilt of the vehicle a fourth indicator may be provided to indicate the state of connection of the control valves for such a height regulating device. Where all the control valves in the air suspension system are solenoid valves the test apparatus may include an indicator responsive to the flow of current through such solenoid valves.

The test apparatus may also be provided with a switching device which simulates the measuring voltage generated when the vehicle is tilted. This voltage may be generated during the return of the gyroscope from a position to which it has been arbitrarily deflected in order to simulate a tilting of the vehicle. Thus, during the return of the gyroscope to its neutral position a simulated voltage will correspond to the return of the vehicle to its upright position from an inclined position.

Other objects and advantages of the present invention will be apparent upon reference to the accompanying description when taken in conjunction with the following drawings, which are exemplary, wherein:

FIG. 2 is a diagram illustrating schematically the test apparatus according to the present invention; and FIGS. 2A–C illustrate schematically and in greater detail several of the components of the test apparatus of FIG. 2.

Proceeding next to the drawings wherein like reference symbols indicate the same parts throughout the various views a specific embodiment of the present invention will be described in detail.

Figure 1:
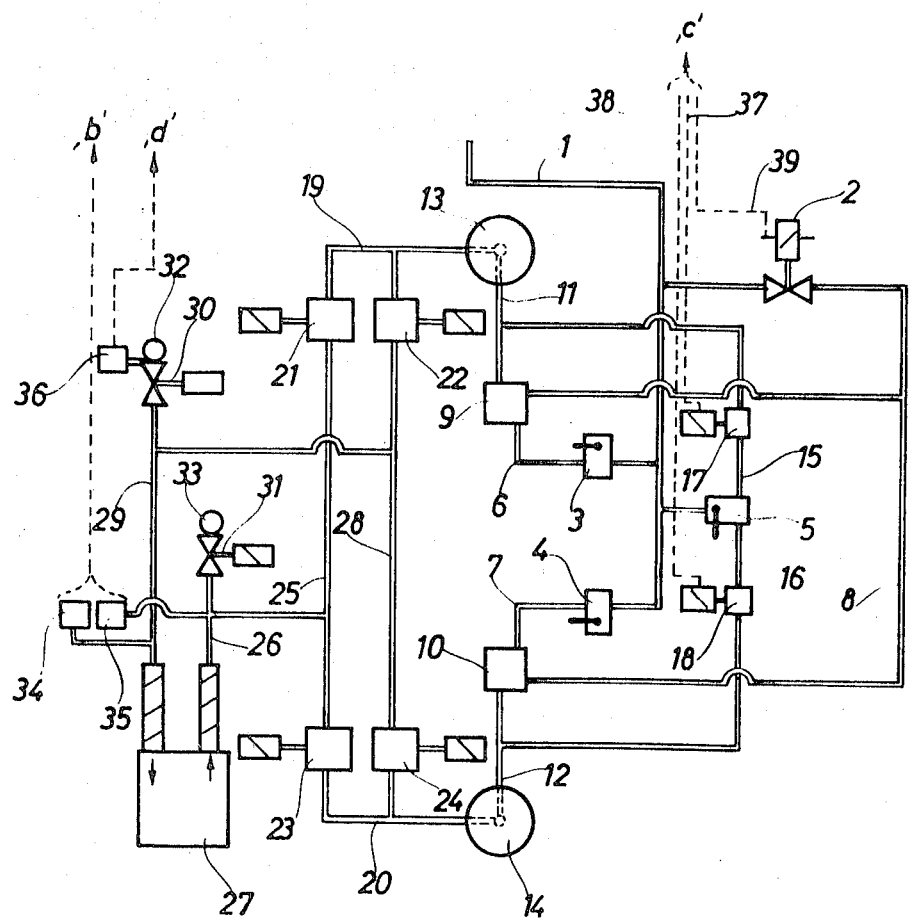
FIG. 1 shows schematically a diagram of the components of the test apparatus connected into an air bellows suspension system for a vehicle.

The pneumatic or air components of an air suspension system to which the present invention relates are shown in FIG. 1 and include a main air supply line 1 which leads to a solenoid valve 2 controlling pressure in a control line 8. The air supply line 1 also leads to level regulating valves 3 and 4 which are positioned on opposite sides of the vehicle body and are actuated by the levers extending therefrom and pivotally connected to the non-cushioned vehicle frame. A height regulating valve 5 is positioned approximately at the center of the vehicle and is also connected to the supply line 1.

The level regulating valves 3 and 4 are connected through pipe lines 6 and 7 to pneumatic shut-off valves 9 and 10 which are closed on application of pressure to the control line 8 which is also connected to these shut-off valves. Further, pipe lines 11 and 12 lead from the shut-off valves 9 and 10 to air suspension cushions or bellows 13 and 14 positioned on opposite sides of the vehicle body.

The output side of the height regulating valve 5 is connected to pipe lines 15 and 16 which lead through separate solenoid control valves 17 and 18 to the air spring bellows 13 and 14. In addition, separate pipelines 19 and 20 lead from the bellows 13 and 14 to solenoid control valves 21, 22 and 23, 24. The solenoid valves 21 and 23 are interconnected by a conduit 25 and are also connected to the discharge line 26 of compressor 27. Solenoid valves 22 and 24 are connected to each other by a conduit 28 and to the intake line 29 of the compressor 27. Intake line 29 and discharge line 26 are each provided with openings 32 and 33 respectively which open to the atmosphere and may be closed by means of solenoid control valves 30 and 31.

For purposes of clarity the various electrical connections as well as the elements for actuating solenoid valves 2, 17, 18, 21, 22, 23, 24, 30 and 31 have not been illustrated in FIG. 1. These electrical connections and the structures for actuating the control valves are similar to the corresponding structures in the patent applications mentioned above. The operation of the air suspension system as described above will also be apparent from these applications and need not be described in detail.

Pressure responsive switches 34 and 35 which operate electrical contacts are connected to the intake line 29 and discharge line 26 respectively. Closing of the contacts of the pressure switches 34 and 35 would generate a signal b in a manner to be presently described and illustrated in FIG. 2A. A vacuum responsive switch 36 is connected to the intake line 29 between the atmospheric opening 32 and solenoid 30 and closes an electrical contact to generate a signal d. Each of the coils of the solenoid valves 17, 18 and 2 have one side connected to ground and the other side connected through electrical leads 37, 38 and 39 respectively to the test apparatus for generating a signal c as shown in FIG. 2B.

As may be seen in FIG. 2 there is provided a sequence switch 43 having stages I and II. Stage I is provided with switch contact 1 connected through lead 40 to a generator 41 drivingly connected to an axle for generating a voltage responsive to the speed of the vehicle and a starting relay 42 for that portion of the control system of the air suspension system which is not shown in the drawing. Starting relay 42 actuates a switch 44 for driving a gyroscope 45 of the curvilinear responsive control system of the air suspension arrangement. A branch 46 extends from a lead connected to switch 44 to a control lamp indicator 47 generating a signal $a$ and then connected to ground.

The switch 43 is provided with six switching steps. In step one, the generator 41 is connected through line 40 to the starting relay 42 whereas in all other remaining steps two-six the switch 43 disconnects the generator 41 from the starting relay 42 and the relay is connected to a line 48 leading to a voltage source 49 which supplies a voltage slightly higher than the starting voltage of the relay 42.

The gyroscope 45 is provided with a shaft 50 about which the gyroscope pivots and this shaft 50 is maintained in a neutral position by springs 51. The shaft 50 is also provided with an armature 54 positioned between electromagnets 52 and 53. The coils of electromagnets 52 and 53 each have one side connected to a voltage source and the other side to the sequence switch 43 through leads 55 and 56. Steps one and two of stage II of sequence switch 43 are open with step three being connected to lead 55 and step five being connected to lead 56. Step four is connected through a resistance $R_1$ to a variable contact 57 of a potentiometer 58 associated with the middle switch of the control system of the air suspension arrangement and to the control system itself. In a similar manner, step six is connected through a resistance $R_2$ to a movable contact 59 of a potentiometer 60 similarly associated with the middle switch and to the control system itself of the air suspension system. The potentiometers 58 and 60 are positioned on opposite sides of the vehicle and the respective movable contacts 57 and 59 are positioned in proportion to the heights of the respective air bellows 13 and 14 of FIG. 1. If the resistances $R_1$ and $R_2$ were not utilized, the movable contacts 57 and 59 would then supply a voltage which is proportional to the heights of the air bellows 13 and 14. This voltage would then be utilized in the control system as a signal indicating the position of the vehicle body with respect to the plane of the track.

The pressure responsive switches 34 and 35 actuate contacts 61 and 62 which are connected in the parallel leads 63 and 64 extending from a voltage source 65 to a signal lamp indicator 66 which generates signal $b$. In the parallel lead 63 a breaker switch $h_1$ is positioned after contact 61 and in the other lead 64 a breaker switch $h_2$ is positioned before the contact 62. The breaker switches $h_1$ and $h_2$ are closed upon energization of a relay coil H connected in parallel with the signal lamp 66. A diode 67 interconnects parallel leads 63 and 64 as shown to permit the flow of current in the direction from contact 61 to contact 62. With this arrangement the pressure responsive contacts are in a series connection with each other when in a state of rest but are connected in parallel after they have been actuated. The indicator lamp is connected only after all of the pressure responsive switches have been properly actuated and is disconnected if a single pressure responsive switch drops out.

The electrical leads 37, 38 and 39 are connected together to a common lead which in turn is connected to a signal lamp indicator 68 which generates signal $c$, as shown in FIG. 2B. The vacuum responsive switch 36 operates a contact 69 connected in a line leading from a voltage source to a signal lamp indicator 70 for generating a signal $d$ as shown in FIG. 2D.

In operation, the test apparatus of the present invention will function in the following manner: when the sequence switch 43 is in switching step one, the axle-driven generator 41 is connected to the starting relay 42 in switching stage I. The air suspension system as well as the control system associated therewith will operate in the usual manner as described in the above two mentioned patent applications. When the vehicle is traveling in a straight line, compressor 27 will be monitored by the vacuum responsive switch 36. As long as the compressor 27 supplies a sufficient quantity of air, a vacuum will act on the vacuum responsive switch 36 to close contact 69 and cause signal lamp 70 to be lighted. This will generate signal *d* which indicates proper operation of compressor 27.

As the speed of the vehicle increases above a predetermined speed the starting relay 42 will be actuated to close switch 44. The closing of switch 44 will start operation of gyroscope 45 and the signal lamp 47 will light up. This will generate signal *a* to indicate the connection of gyroscope 45.

The use of the vacuum responsive switch 36 as described above permits testing, when the vehicle is at rest, of the compressor when it is driven from the vehicle wheel. The connection of the vacuum monitor in the intake line of the compressor between an atmospheric opening and a control valve thus enables the compressor to be tested under the circumstances when the vehicle is traveling in a straight line.

Switching multiple switch 43 into the second switching step when the vehicle is at rest disconnects the voltage generator 41 from the starting relay 42 and connects voltage source 49 to the starting relay to start operation of the gyroscope 45. At the same time, signal *a* will appear on lamp 47 to indicate the operation of the gyroscope.

Upon switching multiple switch 43 to step three, electromagnet 52 will become energized and will attract armature 54 to deflect gyroscope 45 from its neutral position into a left-hand arc while the vehicle is still at rest. During this deflection, the output signal of the gyroscope to the measuring voltage generating means will progressively increase to simulate travel of the vehicle from a straight line into a left-hand transition curve. The air suspension system and its associated control system will respond correspondingly. In response, the control system will supply the commands "tilt to the left," "maintain the level" and "feed (air) to the right" to the solenoid valves 2, 17, 18, 21–24, 30 and 31 of the air suspension arrangement. The test apparatus will indicate proper operation of the control system and solenoid valves as the pressure responsive switches 34 and 35 are subjected to compressed air from the bellows 13 and 14. The contacts 61 and 62 will be closed and current will flow from the voltage source 65 over contact 61, diode 67 and contact 62 to signal lamp 66 to generate signal *b* which indicates proper connection of the air spring bellows 13 and 14 to compressor 27. At the same time, the signal lamp 68 will become illuminated as a result of energization of solenoid valve 2 and one o fthe solenoid valves 17 or 18. Signal *c* will thus be generated to indicate the proper operation of the control system.

During these procedures, when a signal is generated in lamp 66, the relay coil H will become energized and will close the breaker switches $h_1$ and $h_2$. Consequently, the contacts 61 and 62 of pressure switches 34 and 35 will be connected in parallel with respect to each other.

When the gyroscope is fully deflected, the control system of the air suspension arrangement will energize the solenoid valves 21–24, 30 and 31. As a result, the pressure switches 34 and 35 will be subjected to the increasing pressure and contacts 61 and 62 will be opened. Signal lamp 66 will thus be disconnected from its voltage source 65 and signal *b* will be extinguished.

Upon multiple switch 43 being switched to step four, electromagnet 52 will become deenergized and the resistance $R_1$ modifies the voltage occurring on moveable contact 57 of potentiometer 58 so as to simulate an inclination of the vehicle body with respect to the plane of the track. Springs 51 will return gyroscope 45 back into its neutral position. This function wherein the resistance $R_1$ simulates a vehicle moving from a left-hand curve onto a straight line and a control system of the air suspension arrangement responds accordingly. The control system gives the command signals for a progressive tilting of the vehicle to the right in order to return the vehicle body to its vertical upright position. These signals are transmitted to the solenoid control valves of the air suspension arrangement. The intake and discharge lines 29 and 26 of compressor 27 are again subjected to the effect of compressed air from bellow 13 and 14. Monitors 34 and 35 are thus actuated to generate signal *b* in a manner as described above. As soon as the gyroscope 45 has returned to its central or neutral position the control system will interrupt the inclining of the vehicle body to its vertical position even though the middle switches 58, 60 are still out of phase. As a result, all of the solenoid control valves of the air suspension system will not be provided with electric current and signals *b* and *c* will disappear.

Upon further switching of switch 43 into step five, passage of the vehicle through a transition curve from a straight line to a right-hand curve is simulated. The procedures carried out will correspond to those described above for the passage of the vehicle into a left-hand curve and, accordingly, need not be further described. Signals *b* and *c* must first appear initially. As soon as gyroscope 45 reaches its full deflective position signal *b* must again disappear.

When the multiple switch 43 is next switched into step six passage of the vehicle from a right-hand curve into a straight line is simulated. The gyroscope 45 returns from its fully deflected position to its neutral position and the potentiometer 60 is modified by resistance $R_2$ so as to simulate an inclination of the vehicle body. The test procedures are performed similar to those as described for step four above, namely, signal *b* must appear and then disappear together with signal *c*.

Upon a subsequent switching of multiple switch 43 the switch will be in step one which represents a conclusion of the full testing cycle for the control system and air suspension arrangement while the vehicle is at rest. Possible defects or malfunctioning of the control system will be indicated by the lighting or extinguishing of the signal lamps 47, 66 and 68 at improper times during the testing cycle.

By suitably selecting resistances $R_1$ and $R_2$ the off-tune state of the middle switch, namely, potentiometer 58 and/or 60, can be so dimensioned that the correct setting of the middle switch can also be tested.

As a modification of the test apparatus illustrated in FIG. 2 the electrical lead 46 may also be isolated from the line controlled by switch 44 and connected to the gyroscope drive. The line 66 would then be connected to a voltage source over a special switch. This special switch would operate by closing when a certain r.p.m. limit of rotary speed of gyroscope 45 is exceeded. Consequently, this would produce not only monitoring of the gyroscope drive but also of the actual operation of the gyroscope 45 by means of signal *a*.

The above operation of the test apparatus has been described with the multiple switch being switched into successive steps selectively or by an operator. However this entire testing procedure may also be carried out automatically. For automatic operation of the test apparatus there may be provided a known device which will automatically switch multiple switch 43 to its next step as soon as a signal corresponding to a specific switching step appears. Such as signal would be current flow through signal lamps 47, 66 or 68. Thus, once multiple switch 43 is connected in the circuit it would automatically switch through successive switching steps. Upon completion of all of the switching steps of the cycle the driving device can generate a test signal which indicates that the testing procedure is normal and that all signals occurred in the proper sequence.

It is also possible to test several air suspension arrangements such as might exist in a vehicle having a number of mutually independent air suspension systems or in a number of vehicles coupled to form a train. A single operating station for testing the several air suspension systems may be provided and a signal may be generated in the station only upon proper performance of the testing procedure in all of the air suspension arrangements by utilizing jointly connected driving devices. Known series circuits are available for this purpose.

When several air suspension arrangements are to be tested a common operating station may also contain a signal indicator which is connected only upon the operation of all gyroscopes and a signal indicator which is connected only when a proper vacuum is acting on all of the vacuum monitors. This joint monitor arrangement of several air suspension systems can also be obtained by means of known series circuits.

It is therefore apparent that the test apparatus operates through a sequence of switching steps which might be summarized as follows: the first step disconnects the testing device, the second step connects a starting relay to operate the gyroscope, the third step deflects the gyroscope in a predetermined direction, the fourth step disconnects the deflection and simulates a measuring voltage corresponding to inclination of the vehicle with respect to the preceding deflection of the gyroscope, the fifth step switches off the preceding simulation of the measuring voltage and deflects the gyroscope in the other direction, the sixth step again disconnects the deflection and provides a simulation of the measuring voltage, and the following step is step one which disconnects the test apparatus.

It will be understood that the present invention is susceptible to modification in order to adapt to different usages and conditions.

What is claimed is:

1. In a test apparatus for a vehicle, the combination of air supporting bellows means on each side of the vehicle body and means for regulating the level of the vehicle, a compressor having an intake and a discharge and operating at least above a predetermined speed of the vehicle, valve means connecting the compressor intake and discharge and bellows means for opening the intake and discharge to the atmosphere when the vehicle travels in a straight line and for opening and closing the level regulator means, means including a gyroscope responsive to curvilinear travel of the vehicle for actuating said valve means and regulator means so that air is pumped by the compressor from the bellows means on the inside of a curve to the bellows means on the outside of a curve, indicator means responsive to the operation of a gyroscope, selectively operable means for deflecting the gyroscope in either direction when the vehicle is at rest to simulate tilting of the vehicle, second indicator means responsive to said valve means for indicating the states of the connections therebetween, and third indicator means responsive to the level regulator means for indicating the connections thereto.

2. In a test apparatus as claimed in claim 1 and comprising pressure sensing means connected to the intake and discharge of said compressor, said second indicator means being connected to said pressure sensing means so as to be actuated in response to pressure variations in the compressor intake and discharge.

3. In a test apparatus as claimed in claim 2 wherein there is a source of electrical energy, switch means including pressure sensing means contacts actuated by said pressure sensing means for connecting said second indicator means to said source of electrical energy, said switch means connecting said pressure sensing means contacts in a series when the vehicle is at rest and in parallel in response to actuation of the pressure sensing means.

4. In a test apparatus as claimed in claim 3 and comprising parallel electrical leads connecting said second indicator means to said source of electrical energy, a first breaker switch and a first pressure sensing contact in sequence in one of said parallel leads, a second pressure sensing contact and a second breaker switch in sequence in the other of said parallel leads, said breaker switches being actuated in response to a signal to said second indicator means, and a diode connected between said parallel leads after said first breaker switch and said second pressure sensing means contact to permit the flow of a signal current from one to the other of said pressure sensing means contacts so that the closing of said first and second pressure sensing means contacts will pass a signal to said second indicator means.

5. In a test apparatus as claimed in claim 1 wherein the vehicle has eight height regulator means operable during curvilinear travel and responsive to the height of the axis of tilt of the vehicle, second valve means for controlling said height regulator means with respect to said air bellows means, said third indicator means also indicating the connection of said second valve means, the level regulator valve means and second valve means comprising solenoid valves, said third means being electrically actuated, and a common electric lead connecting said third indicator means and said solenoid valves.

6. In a test apparatus as claimed in claim 1 and further comprising means for generating a measuring voltage proportional to the simulated angular deviation of the vehicle from its central vertical longitudinal plane, means for returning said gyroscope to its neutral position from a deflected position, and switch means connectable to said proportional voltage generating means to simulate the measuring voltage during the return of the gyroscope to its neutral position from a position to which the gyroscope was deflected, potentiometer means connected to said switch means for controlling said measuring voltage, and an electrical resistance connected by said switch means to at least a portion of said potentiometer means after the gyroscope has been deflected.

7. In a test apparatus as claimed in claim 6 and comprising means including a starting relay for generating a voltage responsive to the speed of the vehicle, gyroscope switch means actuated by said starting relay in response to the speed responsive voltage for controlling said gyroscope, a voltage source supplying a voltage slightly greater than the starting voltage of the starting relay, multiple switch means for disconnecting said starting relay when the test apparatus is connected in operation and for connecting said starting relay to said voltage source, said multiple switch means, having a sequence of successive switching steps, the first step being connected to the test apparatus, the second step connecting said starting relay to said voltage source, the third step connecting to actuate said gyroscope deflecting means in one direction, the fourth step disconnecting said gyroscope deflecting means and connected to actuate said measuring voltage simulating means, the fifth step disconnecting said measuring voltage simulating means and connected to actuate said measuring voltage simulating means, the next step being said first step to disconnect the test apparatus.

8. In a test apparatus as claimed in claim 7 and comprising means for generating an indicator signal at one step of said multiple switch, drive means for automatically actuating said sequence switch through successive steps in response to said indicator signal, said drive means including means for generating a test signal upon completion of all of the switch steps.

9. In a test apparatus as claimed in claim 8 and comprising a plurality of mutually independent air bellows suspension systems, and fifth indicator means for generating a signal in response to the completion of a testing procedure of each system according to a predetermined pattern.

10. In a test apparatus as claimed in claim 9 and comprising pressure sensing means connected to the intake and discharge of said compressor, said second indicator means being connected to said pressure sensing means so as to be actuated in response to pressure variations in the compressor intake and discharge, sixth indicator means for generating a signal in response to the operation of all of the gyroscopes of the systems, and seventh indicator means for generating a signal in response to a vacuum acting upon all of said pressure sensing means connected to said compressor intakes.

11. In a test apparatus as claimed in claim 1 and comprising means for generating a voltage responsive to the speed of the vehicle, switch means actuated by a starting relay in response to the speed responsive voltage for controlling said gyroscope, and multiple switch means for disconnecting said starting relay when the test apparatus is connected in operation and for connecting said starting relay to a voltage source supplying a voltage slightly higher than the starting voltage of the starting relay.

12. In a test apparatus as claimed in claim 1 and comprising a solenoid valve connected to the intake of said compressor and opening to the atmosphere, vacuum sensing means connected in the intake line of said compressor between said solenoid valve and atmospheric opening, and fourth indicator means responsive to said vacuum sensing means.

References Cited
UNITED STATES PATENTS 2,566,873    9/1951    Britton _____ 116—125 X JERRY W. MYRACLE, Primary Examiner